(No Model.)
B. B. QUINN.
APPARATUS FOR MAKING BRINE.
No. 577,068. Patented Feb. 16, 1897.
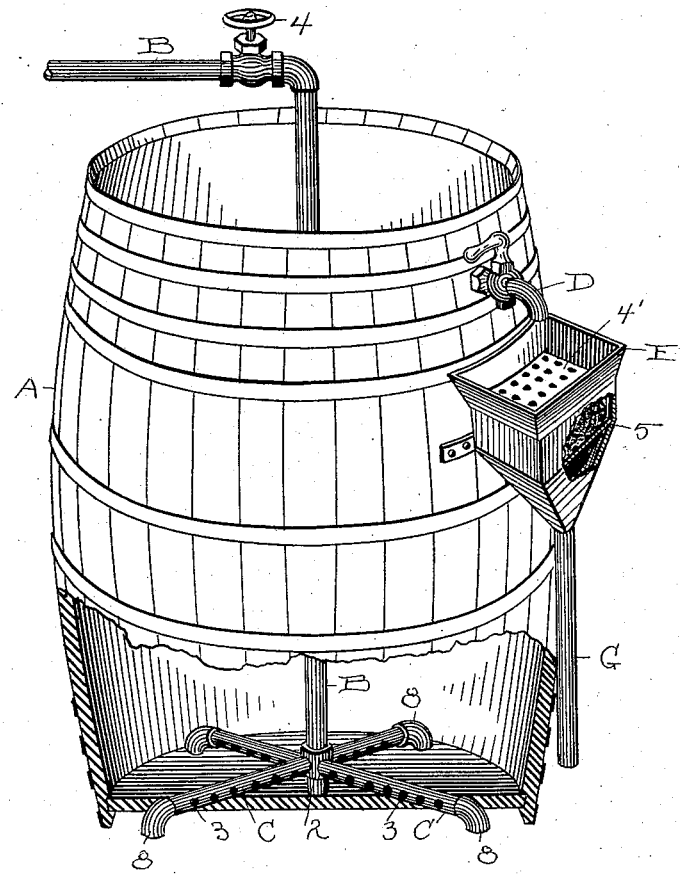
ATTEST
R. B. Moser
H. E. Mudra
INVENTOR.
Bartholomew B Quinn
By H. J. Fisher Atty

UNITED STATES PATENT OFFICE.

BARTHOLOMEW B. QUINN, OF CLEVELAND, OHIO.

APPARATUS FOR MAKING BRINE.

SPECIFICATION forming part of Letters Patent No. 577,068, dated February 16, 1897.

Application filed February 28, 1896. Serial No. 581,187. (No model.)

*To all whom it may concern:*

Be it known that I, BARTHOLOMEW B. QUINN, a citizen of the United States, residing at Cleveland, in the county of Cuyahoga and State of Ohio, have invented certain new and useful Improvements in Means for Making Brine; and I do hereby declare that the following is a full, clear, and exact description of the invention, which will enable others skilled in the art to which it appertains to make and use the same.

My invention relates to a means for making brine for slaughter-houses and other places and uses where brine in large quantities is demanded.

In the accompanying drawing the single figure or illustration shows a perspective view of a barrel or tank with my improved attachments in working position within and upon the same, the tank being broken away at the bottom to disclose the spraying-pipes within. This tank or barrel A may be of the form or style here shown or any other suitable form or style, this in itself not being material. Hence it may be round or square and large or small, but usually, and for even large establishments, a tank of the kind and capacity about as shown will serve every purpose, say, for example, a capacity of seventy-five to a hundred gallons; but this, of course, simply represents its containing and dissolving capacity and not its output in brine. What the output will be will depend altogether on the volume of fresh water supplied, plus the salt it takes away by dissolution, and may be large or small, as may be required. Now, having the tank A, as shown and described, I provide the same with a running supply-pipe B for the water, said pipe in this case being set centrally into the tank from above, and at the lower end of said pipe are four several spraying-arms C, connected by union 2 with said pipe. These arms or pipes 2 have each a series of perforations 3, shown here at the bottom at one or both sides, and in this way the fresh water is delivered into the tank at its bottom through a great number of small streams which reach to every part of the tank and keep up a constant and uniform supply of fresh water to all parts thereof. All the fresh water is delivered to the bottom of the tank and as uniformly as can be to all parts thereof, and as my invention contemplates a constant supply of salt to the tank along with the constant supply of water, and discharges the brine from the top, it follows that only brine and nothing else will escape from or through the outlet D. A cock 4 on the inlet or supply pipe B controls the inflow of water, and the capacity of outlet D is equal to any demand upon it to keep the water in the tank down to working level and to prevent overflow.

In practice I find that by maintaining a steady and liberal flow of fresh water to the tank the tank will dissolve and carry away all the salt that one man can shovel into it by steady and active shoveling. Suppose, for example, that the salt in its granulated form fills the tank half or three-quarters full. The brine of course will rise above or over it, and as fresh water is constantly flowing into the bottom of the tank and carrying on the work of dissolution and saturation from that point, and as it rises through the salt, it follows that brine alone will flow out through faucet D. Hence the supplying of salt and the flowing in of fresh water are going on together and the water and salt are flowing off together as brine. If deemed necessary, a screen of some suitable kind can be placed over the entrance to the faucet or outlet D on the inside of the tank, but such screen should have an open mesh, so as not to become obstructive. On the outside of the tank beneath the faucet D, I provide a screen and filter E, into which the brine discharges from faucet E before it reaches the distributing-pipe G. This filter E is attached to distributing-pipe G, and sponge or other filtering media is employed in the filtering-chamber within filter E and preferably between the perforated plates 4' and 5 in said box. With this arrangement the brine discharges into the filter E and passes through the same into the pipe G in a perfectly liquefied and cleansed condition, because any particles of salt or foreign matter passing through outlet D is intercepted by the filter and can there be seen and removed, if necessary. Of course the filter E is sufficiently porous and open to filter the brine as rapidly as it issues through faucet D.

The fresh-water supply might of course be through the bottom of the tank or through its bottom and side, but the present arrangement is deemed best because it enables the tank to be set up whenever water is available and avoids boring or cutting the tank to make water connection. The water-pipes also may be removed and this leaves the tank free for other uses, if desired.

As many of the spraying arms or pipes may be employed as is thought best, and they rest on the bottom of the tank at their extremities, so as not to be injured or pressed out of connection by the weight of salt upon them. The pipe B likewise rests on the bottom of the tank. Although the tank is largely filled with granular salt, the perforations in the pipes are kept perfectly clear and the water is enabled to circulate by reason of its fresh condition, the salt being rapidly dissolved away in the pressure of flowing water.

In the construction here shown the perforated distributing-tubes C have shoes 8 at their extremities, which close the ends of the tubes and support their ends sufficiently above the barrel to allow the water free discharge and circulation at the bottom of the tubes, it being my practice generally to have the jet perforations 3 directly along the bottom of the tubes. These shoes 8 furthermore serve to close the extremities of said tubes far enough from the wall of the tank to prevent the water from creeping up the said wall instead of going through the salt, as would occur if the water were discharged at or near the same. Hence in any case the outer ends of tubes C must have no perforations discharging near said wall whatever the means for closing their ends and supporting them above the bottom of the tank.

In order to get the desired saturated brine, the tank should be kept full of salt, or nearly so, and by regulating the flow of fresh water you increase or reduce the strength of your brine as required.

Occasionally it will be necessary, with certain qualities of salt, particularly, to cleanse the barrel of foreign deposits, and in such cases the pipe B is connected at the angle of its bend or at any other joint or union and lifted bodily out of the tank with the distributers C, which leaves the tank free to be emptied and cleansed.

What I claim as new, and desire to secure by Letters Patent, is—

The apparatus for making salt brine consisting of the tank open at its top, the water-supply pipe B provided with a cock to regulate the flow of water, the spraying-arms C fed by said pipe and shoes supporting the ends of said arms, and an outlet for the brine near the top of the tank, substantially as described.

Witness my hand to the foregoing specification of this 12th day of February, 1896.

BARTHOLOMEW B. QUINN.

Witnesses:
H. T. FISHER,
H. E. MUDRA.